United States Patent [19]

Britz et al.

[11] Patent Number: 5,279,424
[45] Date of Patent: Jan. 18, 1994

[54] FLOATATION APPARATUS FOR REMOVAL OF DISTRUBING SUBSTANCES, ESPECIALLY PRINTING INK FROM WASTE PAPER SUSPENSIONS

[75] Inventors: Herbert Britz, Konstanz; Erich Linck, Weingarten; Anton Selbherr, Herbertingen, all of Fed. Rep. of Germany

[73] Assignee: Sulzer Escher Wyss GmbH, Ravensburg, Fed. Rep. of Germany

[21] Appl. No.: 887,147

[22] Filed: May 22, 1992

[30] Foreign Application Priority Data

May 24, 1991 [DE] Fed. Rep. of Germany ....... 4116916

[51] Int. Cl.$^5$ .............................. B03D 1/24; B21B 1/32
[52] U.S. Cl. .................................. 209/170; 209/168; 210/221.2; 210/221.1; 162/4; 261/DIG. 75
[58] Field of Search ............... 209/170, 168; 210/221.2, 221.1; 162/4; 261/DIG. 75, 36 R

[56] References Cited

U.S. PATENT DOCUMENTS

| | | | |
|---|---|---|---|
| 1,240,824 | 9/1917 | Clawson | 209/170 |
| 3,772,192 | 11/1973 | Huckstedt | 209/170 |
| 3,865,719 | 2/1975 | Holik | 209/170 |
| 4,186,094 | 1/1980 | Hellberg | 209/170 |
| 4,255,262 | 3/1981 | O'Cheskey | 209/170 |
| 4,328,095 | 5/1982 | Ortner | 209/169 |
| 4,347,128 | 8/1982 | Barnscheidt | 209/170 |
| 4,399,028 | 8/1983 | Kile | 209/170 |
| 4,477,341 | 10/1984 | Schweiss | 209/170 |
| 4,512,888 | 4/1985 | Flynn | 209/170 |
| 4,534,862 | 8/1985 | Zlokarnik | 209/170 |
| 4,548,673 | 10/1985 | Nauda | 209/170 |
| 4,560,474 | 12/1985 | Holik | 209/170 |
| 4,564,457 | 1/1986 | Cairo | 209/170 |
| 4,726,897 | 2/1988 | Schweiss | 209/170 |
| 4,861,165 | 8/1989 | Fredriksson | 209/170 |
| 5,022,984 | 6/1991 | Pimley | 209/170 |
| 5,028,315 | 7/1991 | Cruea | 209/170 |

FOREIGN PATENT DOCUMENTS

| | | | |
|---|---|---|---|
| 90234 | 10/1983 | Fed. Rep. of Germany | 209/170 |
| 3529638 | 7/1986 | Fed. Rep. of Germany | 209/170 |
| 3634903 | 4/1988 | Fed. Rep. of Germany | 209/170 |
| 282492 | 5/1985 | Japan | 209/170 |
| 2102308 | 2/1983 | United Kingdom | 209/170 |

*Primary Examiner*—Thomas M. Lithgow
*Attorney, Agent, or Firm*—Sandler Greenblum & Bernstein

[57] ABSTRACT

The flotation apparatus removes ink- and contaminant particles from a fiber stock suspension which is produced during the preparation of waste paper. Admixing of air to the fiber stock suspension is accomplished in stepped diffusors. The fiber stock suspension admixed with air, prior to infeed into a flotation container, is guided through a deflection element effective as an impact mixer and followed by a mixing diffusor having a preferred flow direction. This flotation apparatus is especially suited for eliminating disturbing or spurious substances which are present throughout a relatively wide grain size spectrum. A particularly preferred construction uses one or more closed flotation containers, wherein the air effluxing from the flotation foam can be advantageously re-used for aeration of further infed fiber stock suspension.

23 Claims, 2 Drawing Sheets

FLOATATION APPARATUS FOR REMOVAL OF DISTRUBING SUBSTANCES, ESPECIALLY PRINTING INK FROM WASTE PAPER SUSPENSIONS

BACKGROUND OF THE INVENTION

1. Field of the Invention

The present invention relates to a new and improved apparatus for the removal of disturbing or spurious substances, especially printing ink from waste paper suspensions.

Generally speaking, the apparatus of the present development for the removal of disturbing or spurious substances, especially printing ink from waste paper suspensions, is of the type comprising at least one fillable container provided with infeed or inlet openings through which there can be introduced the stock suspension to be cleaned, which is admixed with air bubbles, at locations situated beneath the level of the stock suspension in the filled container. An aeration device for the stock suspension is constituted by stepped diffusors where, at the region of a step jump or transition, the air can be sucked in or pressed or forced in. The container is provided with a dam-up or retardation device having an upper edge over which there can be removed the flotation foam or froth containing the disturbing substances. At least one good stock withdrawal or outfeed line is provided at the container beneath the infeed or inlet openings for the stock suspension to be cleaned, through which the cleaned stock suspension can be removed from the container.

2. Discussion of the Background and Material Information

Such type of flotation apparatuses, especially when processing stock suspensions produced from waste paper, serve to eliminate disturbing or spurious substances including printing ink particles therefrom. Thus, as is known in this technology, air bubbles are admixed into the stock suspension which, in the flotation stage, usually in conjunction with admixed chemicals, form a foam or froth containing the disturbing substances or contaminants which is then removed. Stepped diffusors have been found to be useful for producing the air bubbles and for the admixing thereof with the stock suspension. This is so, because such stepped diffusors promote both the sucking in of air and also the formation and distribution of the air bubbles.

A known flotation apparatus of the aforementioned type has been disclosed, for instance, in the commonly assigned German Petty Patent No. 9,007,266, granted Oct. 11, 1990.

However, in known flotation apparatuses it has been repeatedly determined that the flotation operation does not eliminate all of the disturbing particles which are basically capable of undergoing flotation. In particular, it has been found that the range of the grain size, of the actually eliminated disturbing particles is smaller than the range of the grain size of the disturbing particles actually present in the stock suspension.

SUMMARY OF THE INVENTION

Therefore, with the foregoing in mind, it is a primary object of the present invention to provide an improved flotation apparatus for the removal of disturbing or spurious substances, especially printing ink from waste paper suspensions, which is not afflicted with the aforementioned shortcomings and drawbacks of the prior art.

Another and more specific object of the present invention aims at providing an improved flotation apparatus for the removal of disturbing or spurious substances or the like from stock suspensions, which is capable of acting upon and eliminating from the stock suspension an exceedingly wide range of grain sizes of the disturbing substances or contaminants.

Still a further noteworthy object of the present invention is the provision of an improved flotation apparatus for the removal of disturbing or spurious substances, especially printing ink from waste paper suspensions, which is relatively simple in construction and design, exceedingly reliable and cost effective in operation, not readily prone to breakdown or malfunction, and extremely effective in removing a wide grain size range of unwanted particles.

Now in order to implement these and still further objects of the present invention, which will become more readily apparent as the description proceeds, the flotation apparatus of the present development is manifested, among other things, by the features that, viewed in the flow direction of the stock suspension, a deflection element or part effective as an impact mixer follows the stepped diffusor, this deflection element or part causing a substantially right angle deflection or turning of the flow direction of the stock suspension admixed with the air bubbles, and thereafter there is arranged a mixing diffusor downstream of the deflection element or part, this mixing diffusor possessing a diffusor-like flow cross-section which widens in a preferred flow direction of the stock suspension.

According to a further feature of the present invention, the mixing diffusor possesses flow cross-sections which widen or enlarge substantially uniformly and substantially non-uniformly.

Moreover, each of the stepped diffusors of the aeration device can have an inlet cross-sectional area in the range of 300 mm$^2$ to 1000 mm$^2$.

It is further contemplated that each of the stepped diffusors of the aeration device or aeration means have two stepped transitions or jumps defining a first transition and a second transition, and infeed means are provided for each stepped diffusor for infeeding air at a location slightly downstream of the first transition.

As to a further feature, the at least one container can define an essentially closed container having a space located above the level of the stock suspension filled into the at least one container, and the aeration device can be supplied or filled with air from this space.

Still further, there can be provided means for guiding air escaping from the stock suspension filled into the at least one container and air escaping from the flotation foam or froth internally of and/or externally of the at least one container such that such air can be reused for aeration of further stock suspension which is to be cleaned and introduced into the at least one container.

According to a further aspect, it is contemplated that the stepped diffusors automatically suck-in air used for aeration of the stock suspension.

As to another feature, the stepped diffusors are arranged substantially vertically externally of the side walls of the at least one container, and each of the deflection elements comprises a deflection location which brings about an essentially horizontal introduction of the stock suspension into the at least one container.

It is further contemplated to provide at least two containers arranged above one another which define an upper flotation container and a lower flotation container forming a stack of flotation cells. A respective foam or sludge funnel is provided for each the upper flotation container and the lower flotation container. The flotation foam or froth of the upper flotation container flows over the upper edge of the dam-up device into the foam funnel of the upper flotation container and thereafter into the foam funnel of the lower flotation container. Further, there can be provided means for removing good stock from the upper flotation container and the lower flotation container either conjointly or separately.

Still further, a movable or displaceable water injection pipe or conduit or equivalent structure arranged within the at least one container for injecting water for continuously or periodically cleaning the inner wall of such at least one container.

A foam or sludge funnel can be provided for the at least one container, and the movable water injection pipe can be arranged at the region of the foam or sludge funnel or the foam or froth layer within such container.

The inner wall of the at least one container can possess a substantially round or circular cross-section, and the movable water injection pipe can have an outlet opening which is movable along a substantially circular path of travel.

It is also possible for the upper edge of the dam-up device to have a substantially round or circular configuration. A foam or sludge inlet or inlet means is located at the region of the upper edge of the dam-up device, and there can be provided a cleaning element for cleaning the sludge inlet means and which is movable along a substantially circular path of travel.

Even further, there can be provided means for conjointly moving the movable water injection pipe and the cleaning element.

By means of the inventive flotation apparatus, it is possible, in optimum fashion, to admix the stock suspension with air bubbles prior to introduction of such stock suspension into the flotation container. Each stepped diffusor enables admixing a relatively large amount of air, namely, an air charge or load of 60% and more, into the stock suspension. By virtue of the hydraulic conditions prevailing in the stepped diffusor, the sucked-in air is distributed into a multiplicity of air bubbles which are mixed exceedingly well or intensively with the stock suspension. The deflection element or part which is arranged at the downstream end of the stepped diffusor, initially acts as an impact mixer upon the aerated stock suspension, resulting in further improvement in the distribution of the air bubbles. What is also of importance is that the deflection element or part imparts different flow velocities to different flow paths of the stock suspension. This is predicated upon the fact that the different parts of the suspension between the inlet of the deflection element or part and the inlet or inlet means of the flotation container move through different flow paths which additionally have different flow cross-sections. Owing to the specific construction of such deflection element or part there is produced an homogeneous inflow of the stock suspension throughout an impact region into an outflow having an unidirectional preferred flow direction. Regions are formed shortly behind or downstream of the impact mixing zone, viewed throughout the flow cross-section, which have different degrees of turbulence, resulting in different size air bubbles. As a result, there is ensured within a single flotation cell, the deposition of small and large printing ink particles, since small particles are intended to be brought together as much as possible with small air bubbles and large particles as much as possible with large air bubbles. At the same time, due to the intensive admixing action or effect of the stock suspension there is especially promoted the deposition of the small printing ink particles at the air bubbles.

The mixing diffusor located downstream or after the deflection or turning of the stock suspension, additionally affords the advantage of ensuring at the end of the mixing path for a uniform, low inlet or entry velocity of the stock suspension into the flotation container. Consequently, there results a continuous reduction in the degree of turbulence of the stock suspension, yet such still remains large enough to preclude the renewed mutual attachment or agglomeration of the air bubbles. As a result, by virtue of these measures there is obtained an optimum flotation effect or operation within the flotation apparatus.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the flotation apparatus or installation has been depicted therein, in order to simplify the illustration, as needed for those skilled in the art to readily understand the underlying principles and concepts of the present invention.

Figure 1:
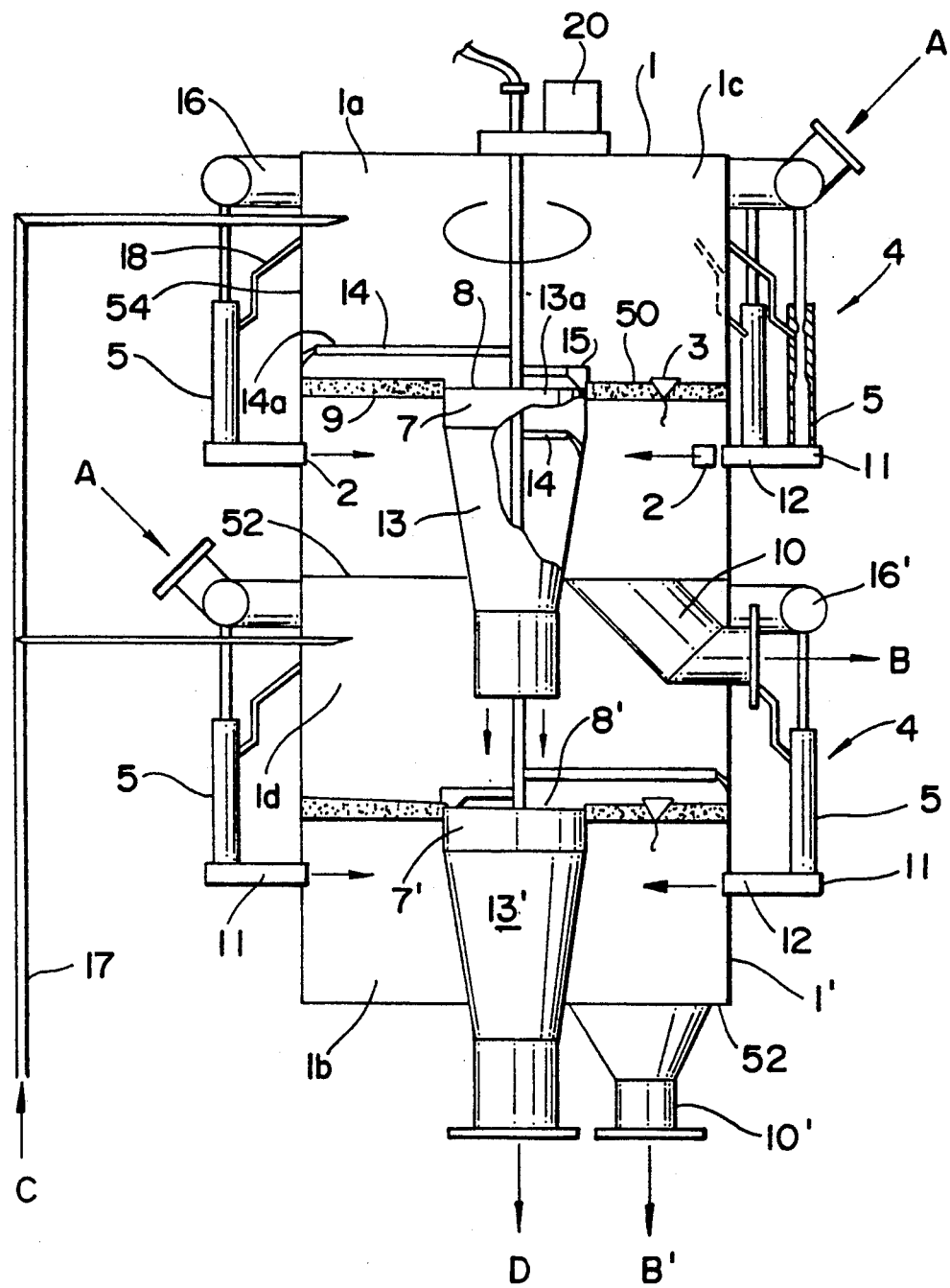
FIG. 1 schematically illustrates in vertical sectional view a flotation apparatus constructed according to the present invention.

Turning attention now to the exemplary embodiment of flotation apparatus depicted in FIG. 1, there will be recognized in the sectional view thereof, two superimposed flotation containers or receptacles 1 and 1' defining stacked flotation cells 1a and 1b. The stock suspension to be cleaned, as generally indicated by the arrows A and A', is infed in each instance through a respective annular or ring-shaped conduit or line 16 and 16' to the associated aeration devices or aeration means 4 containing a multiplicity of stepped diffusors 5 located adjacent, for instance, substantially vertically near to the outer or side wall or surface 54 of the associated container 1 and 1'. In order to preserve clarity of and to simplify illustration of the drawings, not all such stepped diffusors 5, which advantageously may comprise self-priming stepped diffusors, have been depicted. Also, each of the stepped diffusors may advantageously possess an inlet cross-sectional area in the range of 300 mm² to 1000 mm². The aerated stock suspension emerges or effluxes from the stepped diffusors 5 and enters the associated deflection element or part 11 where, at each end thereof, there is integrated or provided an associated mixing diffusor 12, as also readily seen by referring to FIGS. 2 and 3. The stock suspension then flows from the mixing diffusors 12 through the infeed or inlet openings or infeed means 2 into the associated flotation container or receptacle 1 and 1'.

Each of the self-priming aeration devices 4, used in the depicted exemplary embodiment, receive the air needed for their operation from the respective space 1a and 1b within the associated flotation container 1 and 1' located above the level 50 of the stock suspension located with the corresponding flotation container 1 and 1'. In those instances where the flotation containers 1 and 1' are closed, as here shown by way of example and not limitation, it is possible to suck in flotation air through an associated line or conduit or piping structure 17 which can be connected, for example, with the here not depicted sludge collecting container or receptacle, merely symbolized by reference character C. However, as a general rule a large proportion of the air will emanate from the air which escapes from the flotation foam or froth 9 in the corresponding flotation container 1 and 1'. By virtue of the recycled or returned air, this embodiment only produces an exceedingly small, undesired amount of mist or vapor for the ambient or environment. The air in the respective space or chamber 1c and 1d above the stock suspension is conveyed by the lines or conduits 18 into the aeration devices 4. The good stock, generally indicated by the arrows B and B' respectively, is removed at the region of the floor or base 52 of the associated flotation container 1 and 1', and such good stock removal can be conjointly or separately undertaken at these containers. The flotation foam or froth 9 or the like overflowing an upper edge 8 of an associated dam-up or retardation device 7, moves in the direction of the arrow D, through the related foam or sludge funnel 13 and 13' out of the respective flotation container 1 and 1'.

In FIG. 1 there are also depicted water spraying pipes or conduits 14 having outlet openings 14a for a suitable cleaning agent, here, for instance, water, and cleaning elements 15, by means of which it is possible to appreciably increase the operational reliability of the flotation apparatus without manual intervention. As further depicted, the water spraying pipes or conduits 14 and cleaning elements 15 of two flotation cells, here the stacked flotation cells 1a and 1b, are conjointly moved by a suitable drive motor 20, that is, can be, for instance, rotated along a circular cleaning path. The water spraying pipes or conduits 14 or the like clean the inner wall 52 of the associated container 1 and 1', and the cleaning elements 15, through which there likewise can be fed a suitable cleaning agent, such as water, clean the foam or sludge inlet openings or inlets 13a of the respective funnels 13 and 13'.

Figure 2:
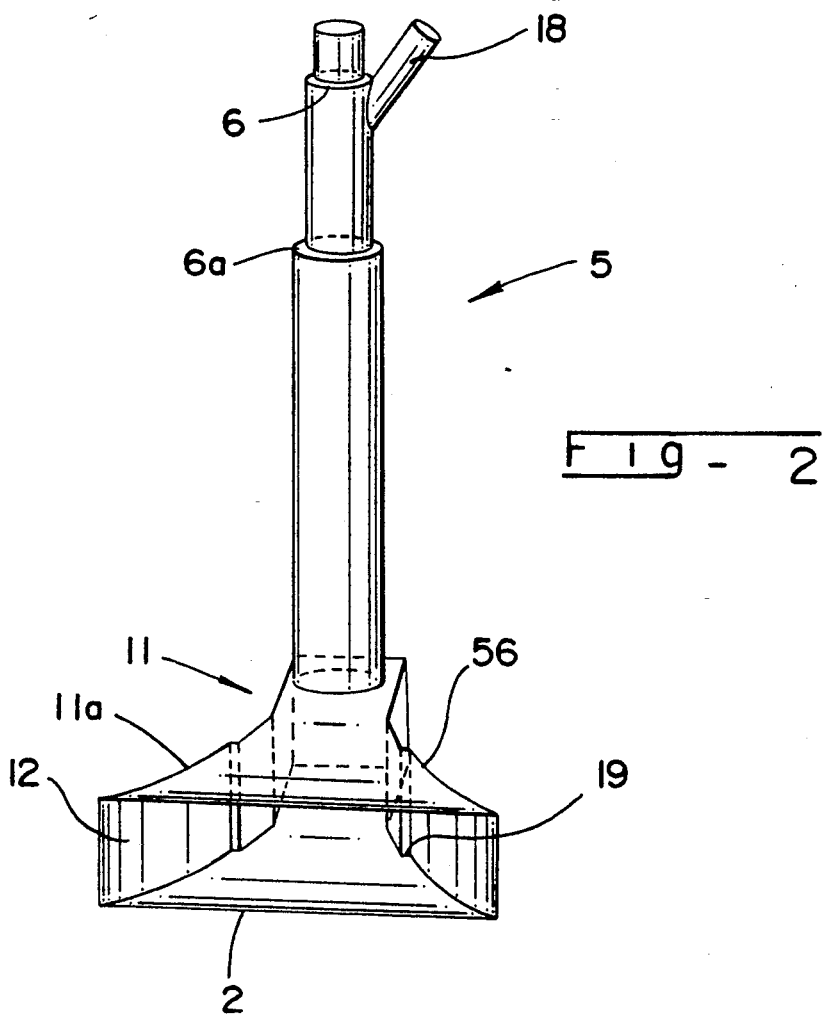
FIG. 2 schematically illustrates in perspective view a stepped diffusor and a deflection element or part used in the flotation apparatus depicted in FIG. 1.

FIG. 2 is a perspective view depicting details of one of the stepped diffusors 5 together with a therewith merging deflection element or part 11. Each of the deflection elements 11 comprises a deflection location or portion 11a which effectuates an essentially horizontal introduction of the stock suspension into the associated container. Furthermore, at such stepped diffusor 5 there is visible part of the associated air infeed line or conduit 18 used for aeration and which opens at the neighborhood of a step jump or transition 6, here immediately or closely downstream thereof with respect to the direction of movement or flow of the stock suspension therethrough. This step jump or transition is followed by a further step jump or transition 6a, as shown.

Moreover, the illustration of the deflection element or part 11 particularly portrays the diffusor-like or diffusor-shaped widening or enlarged portion 56 of the mixing diffusor 12, and in the embodiment depicted there is provided a jump or transition edge 19, defining a turbulence promoter or generator, which further improves turbulence of the stock suspension. The flow cross-section of the mixing diffusor can widen in a uniform and/or non-uniform fashion in a preferred flow direction of the throughflowing stock suspension admixed with air.

Figure 3:
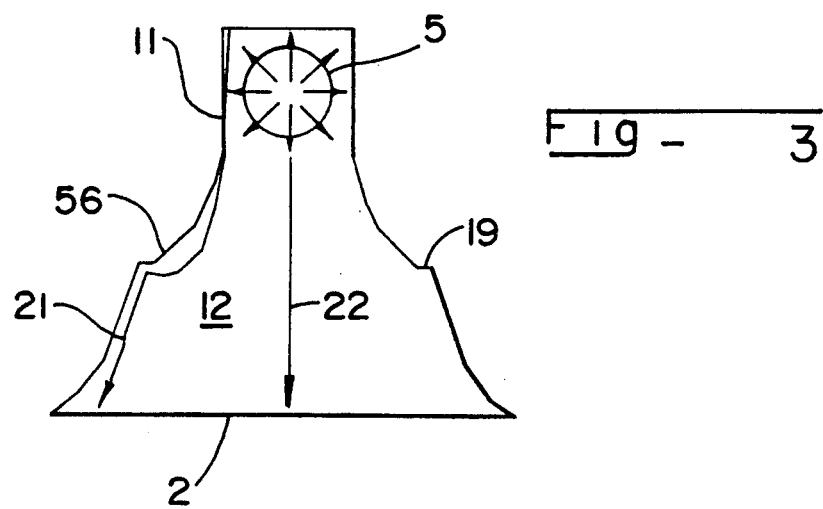
FIG. 3 schematically illustrates in top plan view flow paths of the stock suspension in the deflection element or part.

FIG. 3 depicts the course of flow streams or flow lines of the stock suspension within the deflection element or part 11, as viewed in the direction of exit or outflow of the stock or stock suspension flow or stream out of the stepped diffusor 5. There can be clearly recognized the different lengths of two illustrated flow paths or streams 21 and 22 in such deflection element or part 11.

Finally, it is mentioned that it should be evident that the inventive flotation apparatus can be used in conjunction with contaminated stock suspensions which are not produced from waste paper to the extent that the nature and size of the contaminant particles are comparable to those of the particles with which there are solved the objectives of the present invention and thus can be floated out of such suspension.

While there are shown and described present preferred embodiments of the invention, it is distinctly to be understood the invention is not limited thereto, but may be otherwise variously embodied and practiced within the scope of the following claims.

What is claimed is:

1. A flotation apparatus for the removal of printing ink from waste paper suspensions, comprising:
   at least one container into which there can be filled a stock suspension to be cleaned;
   said at least one container being provided with infeed openings through which there can be introduced the stock suspension to be cleaned, which is admixed with air bubbles, at locations situated beneath a predetermined level of the stock suspension in the at least one container;
   feed means for feeding said stock suspension connected to said infeed opening, said feed means comprising an aeration device for the stock suspension;
   said aeration device comprising at least one stepped diffusor having at least one step transition and means for introducing air adjacent to and downstream of said at least one step transition;
   a dam-up device located inside said at least one container and having an upper edge over which a flotation foam containing said ink is removed;
   at least one good stock outfeed line provided in the at least one container beneath the infeed openings for the stock suspension to be cleaned, through which there can be removed from the at least one container a cleaned stock suspension;
   said feed means further comprising a deflection element effective as an impact mixer connected downstream of said at least one stepped diffusor;
   said deflection element comprising deflecting means for deflecting the flow direction of the stock suspension admixed with the air bubbles which effluxes from the at least one stepped diffusor at a substantially abrupt right angle;
   a mixing diffusor connected downstream of the deflection element; and said mixing diffusor comprising a first pair of opposed walls connected to each other by a second pair of opposed walls, said first pair of walls being planar in shape and generally parallel to each other with the second pair of walls diverging from each other away from said deflecting element in a preferred flow direction.

2. The flotation apparatus according to claim 1, wherein:
said mixing diffusor possesses a flow cross-section which substantially uniformly widens.

3. The flotation apparatus according to claim 1, wherein:
said mixing diffusor possesses a flow cross-section which substantially non-uniformly widens.

4. The flotation apparatus according to claim 1, wherein:
said mixing diffusor possesses a flow cross-section which both substantially uniformly widens over a first portion and non-uniformly widens over a second portion.

5. The flotation apparatus according to claim 1, wherein:
the at least one stepped diffusor comprises a plurality of stepped diffusors; and
each of the stepped diffusors of the aeration device has an inlet cross-sectional area in the range of 300 mm² to 1000 mm².

6. The flotation apparatus according to claim 1, wherein:
the at least one stepped diffusor comprises a plurality of stepped diffusors;
each of the stepped diffusors of the aeration device has two stepped transitions defining a first transition and a second transition; and
means provided for each stepped diffusor for infeeding air at a location slightly downstream of the first transition.

7. The flotation apparatus according to claim 1, wherein:
said at least one container defines an essentially closed container having a space located above the level of the stock suspension filled into the at least one container; and
means for supplying air from the space above the suspension in the container to said aeration device.

8. The flotation apparatus according to claim 1, wherein:
said stepped diffusor has a longitudinal axis;
said deflection means comprises a lower surface substantially perpendicular to said longitudinal axis of said stepped diffusor; and
said mixing diffusor comprises lateral surfaces that diverge in the preferred flow direction and end at at least one of said infeed openings into said at least one container.

9. The flotation apparatus according to claim 1, wherein:
the at least one stepped diffusor comprises a plurality of stepped diffusors; and
the stepped diffusors comprise self-priming stepped diffusors which automatically suck-in the air used for aeration of the stock suspension.

10. The flotation apparatus according to claim 1, wherein:
the at least one stepped diffusor comprises a plurality of stepped diffusors;
the at least one container has side wall means; and
the stepped diffusors are arranged substantially vertically externally of the side wall means of the at least one container; and
each of the deflection elements comprises a deflection location which effectuates an essentially horizontal introduction of the stock suspension into the at least one container.

11. The flotation apparatus according to claim 1, wherein:
the at least one container comprises at least two containers arranged above one another to define an upper flotation container and a lower flotation container;
a respective foam funnel provided for each the upper flotation container and the lower flotation container;
the flotation foam of the upper flotation container flowing over the upper edge of the dam-up device into the foam funnel of the upper flotation container and thereafter into the foam funnel of the lower flotation container; and
means for removing good stock from the upper flotation container and the lower flotation container.

12. The flotation apparatus according to claim 11, wherein:
the means for removing good stock from the upper flotation container and the lower flotation container conjointly removes the good stock from both the upper flotation container and the lower flotation container.

13. The flotation apparatus according to claim 11, wherein:
the means for removing good stock from the upper flotation container and the lower flotation container separately removes the good stock from each of the upper flotation container and the lower flotation container.

14. The flotation apparatus according to claim 1, wherein:
the at least one container has an inner wall;
a movable water injection pipe arranged within the at least one container for injecting water for cleaning the inner wall of the at least one container; and
means for moving said movable water injection pipe within said at least one container.

15. The flotation apparatus according to claim 14, wherein:
the movable water injection pipe is structured for continuously cleaning the inner wall of the at least one container.

16. The flotation apparatus according to claim 14, wherein:
the movable water injection pipe is structured for periodically cleaning the inner wall of the at least one container.

17. The flotation apparatus according to claim 14, wherein said dam-up device comprises:
a foam funnel provided for the at least one container, the foam funnel having a portion defining an inlet opening; and
the movable water injection pipe is arranged at the region of the portion of the foam funnel that defines the inlet opening for cleaning said portion.

18. The flotation apparatus according to claim 14, wherein:
the inner wall of the at least one container possesses a substantially round cross-section; and and the movable water injection pipe has an outlet opening which is movable along a substantially circular path of travel.

19. The flotation apparatus according to claim 1, wherein:
   the upper edge of the dam-up device has a substantially round configuration;
   a foam inlet means located at the region of the upper edge of the dam-up device; and
   a cleaning means for cleaning the foam inlet means and movable along a substantially circular path of travel.

20. The flotation apparatus according to claim 19, wherein:
   the at least one container has an inner wall;
   a movable water injection pipe arranged within the at least one container for injecting water for cleaning the inner wall of the at least one container;
   the inner wall of the at least one container possesses a substantially round cross-section;
   the movable water injection pipe has an outlet opening which is movable along a substantially circular path of travel; and
   means for conjointly, moving the movable water injection pipe and the cleaning means.

21. The flotation apparatus according to claim 1, wherein:
   said deflecting means of said deflection element comprise junction surfaces connected at a substantially right angle for deflecting the flow direction of the stock suspension admixed with the air bubbles which effluxes from the at least one stepped diffusor.

22. The flotation apparatus according to claim 8, wherein:
   said lateral surfaces diverge substantially uniformly in the preferred flow direction.

23. The flotation apparatus according to claim 8, wherein:
   said lateral surfaces comprise at least respective portions which diverge monotonically substantially non-uniformly in the preferred flow direction.

* * * * *